(12) United States Patent
Maeda

(10) Patent No.: US 6,710,565 B2
(45) Date of Patent: Mar. 23, 2004

(54) MANUAL INPUTTING DEVICE CAPABLE OF IMPARTING MANIPULATION FEELING

(75) Inventor: Takuya Maeda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 27 days.

(21) Appl. No.: 10/210,332

(22) Filed: Aug. 1, 2002

(65) Prior Publication Data

US 2003/0030407 A1 Feb. 13, 2003

(30) Foreign Application Priority Data

Aug. 7, 2001 (JP) .................................. 2001-239504
Sep. 10, 2001 (JP) .................................. 2001-273797

(51) Int. Cl.[7] ................................................ G05B 5/00
(52) U.S. Cl. ........................ 318/466; 318/282; 318/286; 318/468; 318/568.17; 200/501; 345/184; 307/10.4
(58) Field of Search ................................ 318/266, 268, 318/282, 286, 449, 466, 470, 560, 568.17; 200/501; 345/184; 307/10.1, 9.1, 10.4

(56) References Cited

U.S. PATENT DOCUMENTS

| | | | | |
|---|---|---|---|---|
| 4,350,938 A | * | 9/1982 | Ecole ........................ | 318/443 |
| 5,381,080 A | | 1/1995 | Schnell et al. | |
| 5,612,600 A | * | 3/1997 | Bratkowski et al. ........ | 318/266 |
| 5,762,579 A | * | 6/1998 | Torii et al. .................... | 477/11 |
| 5,907,139 A | * | 5/1999 | Fukatsu et al. .......... | 200/19.01 |
| 6,112,583 A | * | 9/2000 | Yamamura ................... | 73/116 |
| 6,154,201 A | | 11/2000 | Levin et al. | |
| 6,504,276 B2 | * | 1/2003 | Yamamura ................ | 310/75 D |

FOREIGN PATENT DOCUMENTS

| | | |
|---|---|---|
| DE | 197 12 048 A | 12/1998 |
| DE | 200 14 425 U | 1/2001 |
| FR | 2 370 349 | 6/1978 |

OTHER PUBLICATIONS

Patent Abstract of Japan vol. 2000, No. 10, Nov. 17, 2000 (JP 2000 202 163, filed Jul. 25, 2000).

* cited by examiner

*Primary Examiner*—Rina I. Duda
(74) *Attorney, Agent, or Firm*—Brinks Hofer Gilson & Lione (57) ABSTRACT

A manual inputting device which includes a sun gear, three planet gears, a motor having an output shaft thereof fixed to the sun gear, a ring gear casing integrally forming a ring gear on an inner peripheral surface thereof, a carrier rotated along with revolution of the planet gears, a carrier shaft mounted on the carrier, a restricting member facing the carrier in an opposed manner while sandwiching the planet gears therebetween, a knob fixed to the carrier shaft, a code plate integrally formed with the sun gear, a light emitting section, a light receiving section, a connector for outputting detection signals generated from the light receiving section, a board connecting these components thereto, a body casing, a bracket served for fixing the motor to the body casing, and a control unit for controlling the motor in response to detection signals from the light receiving section.

8 Claims, 9 Drawing Sheets

MANUAL INPUTTING DEVICE CAPABLE OF IMPARTING MANIPULATION FEELING

BACKGROUND OF THE INVENTION

1. Field of the Invention

The present invention relates to a manual inputting device which is used, for example, for manipulation of an electric apparatus mounted on a vehicle and is capable of imparting a manipulation feeling to a manipulator who manipulates a manipulating member in response to a rotational quantity or a rotational direction of the manipulating member such as a knob which is manually manipulated.

2. Description of the Related Art

Conventionally, electric apparatuses such as an air conditioner, a radio, a television set, an audio set and the like are mounted on an automobile, for example. To manipulate these electric apparatuses using different manipulation means respectively, this may hamper the driving of the automobile. Accordingly, to prevent the interruption of driving, the temperature control of the air conditioner, the control of a tuner of the radio, the control of sound volume and sound quality of the television set, the radio and the audio set are performed using a single manual inputting device. As this type of manual inputting device, there has been known a manual inputting device which enhances the operability of a manipulating member which is manually manipulated, for example, a knob by imparting a given manipulation feeling to the knob gripped by a manipulator in response to a rotational amount and a rotational direction of the knob, for example.

Figure 9:
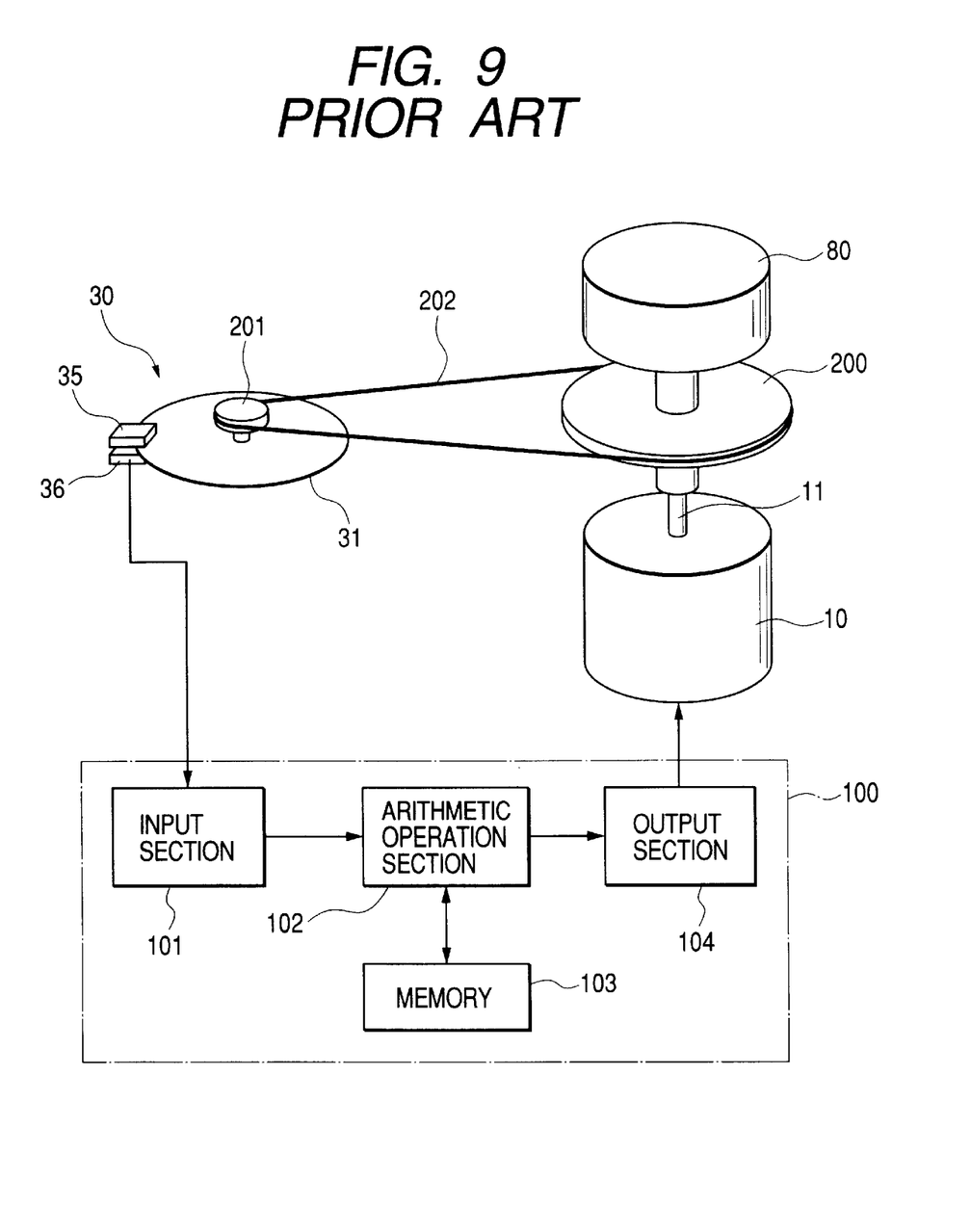
FIG. 9 is an explanatory view showing a basic constitution of a conventional manual inputting device.

The conventional manual inputting devices is explained in conjunction with the drawing hereinafter.

FIG. 9 is an explanatory view for explaining a basic constitution of the conventional manual inputting device.

The conventional manual inputting device includes a knob 80 which is manually operated, a motor 10 which imparts a given manipulation feeling in response to a rotational direction and a rotational amount of the knob 80, a detection means which detects the rotational amount of the knob 80 and a control means which controls the motor 10 in response to a detection result obtained from the detection means.

The detection means is constituted of a large pulley 200 which is fixed to an output shaft 11 of the motor 10, a small pulley 201, a belt 202 which is wound around the large pulley 200 and the small pulley 201 and an encoder 30.

The encoder 30 includes a code plate 31 which is provided with a plurality of slits not shown in the drawing along a circumference thereof and is integrally rotated with the small pulley 201 and a light emitting section 35 and a light receiving section 36 which are arranged to face each other in an opposed manner while sandwiching the code plate 31. The light receiving section 36 outputs detection signals corresponding to the rotational direction and the rotational amount of the knob 80 to a control unit 100 which constitutes the control means of the motor 10.

The control unit 100 includes an input section 101 to which the detection signals are inputted from the light receiving section 36, a memory 103 which prestores control signals of the motor 10 corresponding to the detection signals in a form of a table, an arithmetic operation section 102 which reads out the control signals stored in the memory 103 in response to the detection signals and an output section 104 which outputs the control signals read out by the arithmetic operation section 102 to the motor 10.

With respect to the conventional manual inputting device having such a constitution, when the knob 80 is rotated, the code plate 31 is rotated by way of the large pulley 200 and the small pulley 201. Then, the light receiving section 36 receives light from the light emitting section 35 which has passed through the slit and outputs the detection signal to the input section 101 of the control unit 100. In the arithmetic operation section 102, the control signal is read out from the memory 103 in response to the detection signal. This control signal is outputted to the motor 10 from the output section 104. Accordingly, the motor 10 transmits a rotational force to the knob 80 by way of the output shaft 11 in response to the rotational amount and the rotational direction of the knob 80.

With respect to the knob 80 to which the rotational force is imparted in the above-mentioned manner, when a manipulator turns the knob 80 in the direction that the sound volume is increased at the time of adjusting the sound volume of a radio, for example, the rotational force in the direction opposite to such a rotational direction is imparted to the knob 80 by the motor 10 so that a feeling of resistance is imparted to the manipulator. On the other hand, when the manipulator turns the knob 80 in the direction which lowers the sound volume, the rotational force in the direction equal to the rotational direction is imparted to the knob 80 by the motor 10 so that the manipulator receives a feeling of acceleration.

With respect to the conventional manual inputting device, in an attempt to make the device compact and light-weighted, since the large pulley 200 and the small pulley 201 are arranged in parallel, it is possible to make these large pulley 200 and small pulley 201 small-sized. However, when the small pulley 201 is made excessively small, a contact area with the belt 202 is reduced so that the transmission efficiency of rotation from the large pulley 200 is lowered. Accordingly, there exists a limit in the reduction of the size of the small pulley 201. Further, when the rotation of the knob 80 is detected while increasing the resolution to some extent, since the resolution is determined by a ratio between the diameter of the small pulley 201 and the diameter of the large pulley 200, along with the fact that the reduction of size of the small pulley 201 is impossible, the diameter of the large pulley 200 is liable to be increased.

Further, when the size of the knob 80 is increased to some extent to facilitate the gripping thereof, the motor 10 which is directly connected to the knob 80 is forced to output a torque which matches the size of the knob 80. Accordingly, the motor 10 is also liable to become large-sized.

In view of the above-mentioned circumstances, it is difficult to make the conventional manual inputting device small-sized and light-weighted and hence, the conventional manual inputting device is not suitable for installing the device in a limited space in the inside of an automobile or the like.

SUMMARY OF THE INVENTION

The present invention has been made in view of the above-mentioned drawbacks and it is an object of the present invention to provide a manual inputting device which can make the device small-sized and light-weighted.

To achieve the above-mentioned object, the manual inputting device of the present invention includes: a manipulating member which is manually operated and transmits signals corresponding to a rotational amount derived from the manual manipulation; a motor which imparts a given feeling of manipulation to the manipulating member in response to the rotational amount derived from the manual operation; the manual inputting device of this invention further includes a planetary gear mechanism having a sun gear, planet gears, a ring gear, a carrier and a carrier shaft; a fixing member which fixes the ring gear of the planetary gear mechanism; detection means which detects a rotational amount of an output shaft of the motor; and control means which controls rotation of the motor in response to a detection result of the detection means, wherein an output shaft of the motor is integrally formed with the sun gear, and the manipulating member is integrally formed with the carrier shaft of the planetary gear mechanism.

In the manual inputting device having such a constitution, when the manipulating member is rotated in the clockwise direction, for example, the carrier shaft, that is, the carrier which is rotated integrally with the manipulating member is rotated in the clockwise direction. Here, since the ring gear is always fixed by the fixing member, respective planet gears revolve in the clockwise direction about the sun gear while rotating in the counterclockwise direction. Then, the rotation of the planet gears is transmitted to the sun gear so that the sun gear is rotated in the clockwise direction.

Here, the rotation of the sun gear is increased with respect to the rotation of the manipulating member corresponding to the teeth number ratio between the sun gear and the ring gear. Accordingly, the resolution of the rotational amount of the manipulating member is enhanced. In the detection means, the rotation of the sun gear which is rotated in this manner, that is, the rotation of the output shaft of the motor fixed to the sun gear is detected.

Then, the control means makes the motor output the rotational force in response to a detection result of the detection means. The rotational force, for example, the rotational force in the counterclockwise direction outputted from the motor is transmitted to the planet gears by way of the sun gear. Here, since the ring gear is always fixed to a ring gear casing by way of the fixing member, the rotational force is applied to respective planet gears in the counterclockwise revolving direction about the sun gear as well as in the clockwise rotational direction about their axes. Accordingly, the rotational force in the counterclockwise direction is applied to the carrier, that is, the carrier shaft.

The rotational force of the carrier shaft is increased with respect to the rotational force of the sun gear, that is, the rotational force of the output shaft of the motor which is integrally rotated with the sun gear. The rotational force in the counterclockwise direction which is increased in the above-mentioned manner is applied to the manipulating member. Accordingly, when the manipulator turns the manipulating member in the clockwise direction, the manipulator receives a feeling of resistance as a feeling of manipulation. On the other hand, when the motor is rotated in the clockwise direction, the rotational force in the direction equal to the rotational direction of the motor is imparted to the manipulating member and hence, the manipulator can obtain a feeling of acceleration as the feeling of manipulation.

In the present invention, it is possible to impart a given feeling of manipulation to the manipulator in the above-mentioned manner. Accordingly, the manual inputting device can exhibit the excellent operability in the same manner as the prior art. In addition to such an advantageous effect, since the motor, the planetary gear mechanism, the detection means and the manipulating member can be arranged on the same axis, it is possible to arrange the whole manual inputting device in a compact form. Accordingly, the miniaturization and the reduction of weight of the manual inputting device can be realized.

Further, in the present invention, in detecting the rotation of the manipulating member, it is possible to enhance the resolution of the rotational amount of the manipulating member using the planetary gear mechanism. Further, in imparting the rotational force to the manipulating member, it is possible to impart the rotational force to the manipulating member after increasing the torque outputted from the motor using the planetary gear mechanism. That is, with the use of the planetary gear mechanism, the increase of the torque outputted from the motor and the enhancement of the resolution of the rotational amount of the manipulating member can be achieved with the compact structure. Accordingly, it is also possible to make the manual inputting device small-sized and light-weighted from this aspect.

Further, in the present invention, the manual inputting device may be configured to further include: guide means which movably supports the manipulating member in the axial direction thereof; biasing means which biases the manipulating member in the axial direction; and a switch manipulating portion for operating a given switch in response to movement of the manipulating member against the biasing means.

In the manual inputting device having such a constitution, the manipulating member is always biased in the axial direction by means of the biasing means and is held in place. When the manipulating member which is held in this manner is pushed against the biasing means, the manipulating member is moved while being guided by the guide means. Corresponding to such a movement, the switch manipulating portion comes into contact with the given switch and operates the switch. Thereafter, when the pushing pressure is released from the manipulating member, the manipulating member returns to the above-mentioned given place by means of the biasing means so that the switch manipulating portion is moved away from the switch whereby the switch becomes inoperable.

That is, in the manual inputting means, the switch is operated by pushing the manipulating member and hence, the manipulating member can be used as a push button switch. Accordingly, the number of apparatuses which can be handled by a single manual inputting device can be increased.

Further, the present invention is also directed to a manual inputting device which includes: a manipulating member which is manually rotated and transmits signals corresponding to a rotational amount derived from the rotational manipulation; a motor which imparts a given feeling of manipulation in response to the rotational amount derived from the rotational manipulation; a planetary gear mechanism having a sun gear to which a rotational force is inputted from an output shaft of the motor, a plurality of planet gears which mesh with the sun gear and revolve around the sun gear, a ring gear which has an inner peripheral side thereof meshed with the planet gears, a carrier which is integrally rotated with the revolving planet gears and a carrier shaft which outputs a rotational force of the carrier to the manipulating member; a fixing member which fixes the ring gear of the planetary gear mechanism; detection means which detects a rotational amount of an output shaft of the motor; control means which controls rotation of the motor in response to a detection result of the detection means; and adjusting means which is capable of adjusting meshing of the sun gear and the planet gears.

In the manual inputting device having such a constitution, the sun gear and the planet gears can be adjusted in the properly meshed state by the adjusting means and hence, the occurrence of the excessive backlash derived from play between components can be prevented whereby the high transmission efficiency can be ensured between the manipulating member and the output shaft of the motor.

Further, in the present invention, the adjusting means may be provided with support means which supports the sun gear in a tiltable manner and may form either one of the sun gear or the planet gears in a barrel shape.

In the manual inputting device having such a constitution, it is possible to make the sun gear and the planet gears meshed with each other in a state that the center of rotation of the sun gear is obliquely disposed with respect to the center of revolution of the planetary gears by tilting the sun gear. Accordingly, the displacement between the output shaft of the motor and the carrier shaft can be eliminated.

Further, in the present invention, the support means may include: a first rotary body which is fixed to the output shaft of the motor; a the second rotary body which is fixed to the sun gear and is engaged and integrally rotated with the first rotary body; and engaging means which makes the first rotary body and the second rotary body engaged with each other such that the second rotary body is tiltably supported and also makes the first rotary body and the second rotary body engaged with each other such that the rotary bodies are integrally rotated.

In the manual inputting device having such a constitution, not only is it possible to make the first rotary body and the second rotary body engage with each other by means of the engaging means such that the sun gear is tiltable, but also it is possible to rotate the first rotary body and the second rotary body integrally so that the rotational force outputted from the output shaft can be surely inputted to the sun gear.

Further, in the present invention, the support means may include a projection which is mounted on a center of rotation of one of the first rotary body and the second rotary body and the recess which is formed in a center of rotation of the other rotary body and is brought into slide contact with the projection.

In the manual inputting device having such a constitution, the force in the direction toward the center of rotation which is imparted to the sun gear can be received by the first rotary body and hence, it is possible to surely hold the sun gear and the planet gears in the properly meshed state.

Further, in the present invention, the detection means may include a code plate which is integrally rotated with the output shaft of the motor and the code plate may be integrally formed with the first rotary body.

The manual inputting device having such a constitution can reduce the number of parts.

DESCRIPTION OF PREFERRED EMBODIMENTS

Preferred embodiments of the present invention are explained hereinafter in conjunction with attached drawings.

A first embodiment of a manual inputting device of the present invention is explained in conjunction with drawings.

Figure 1:
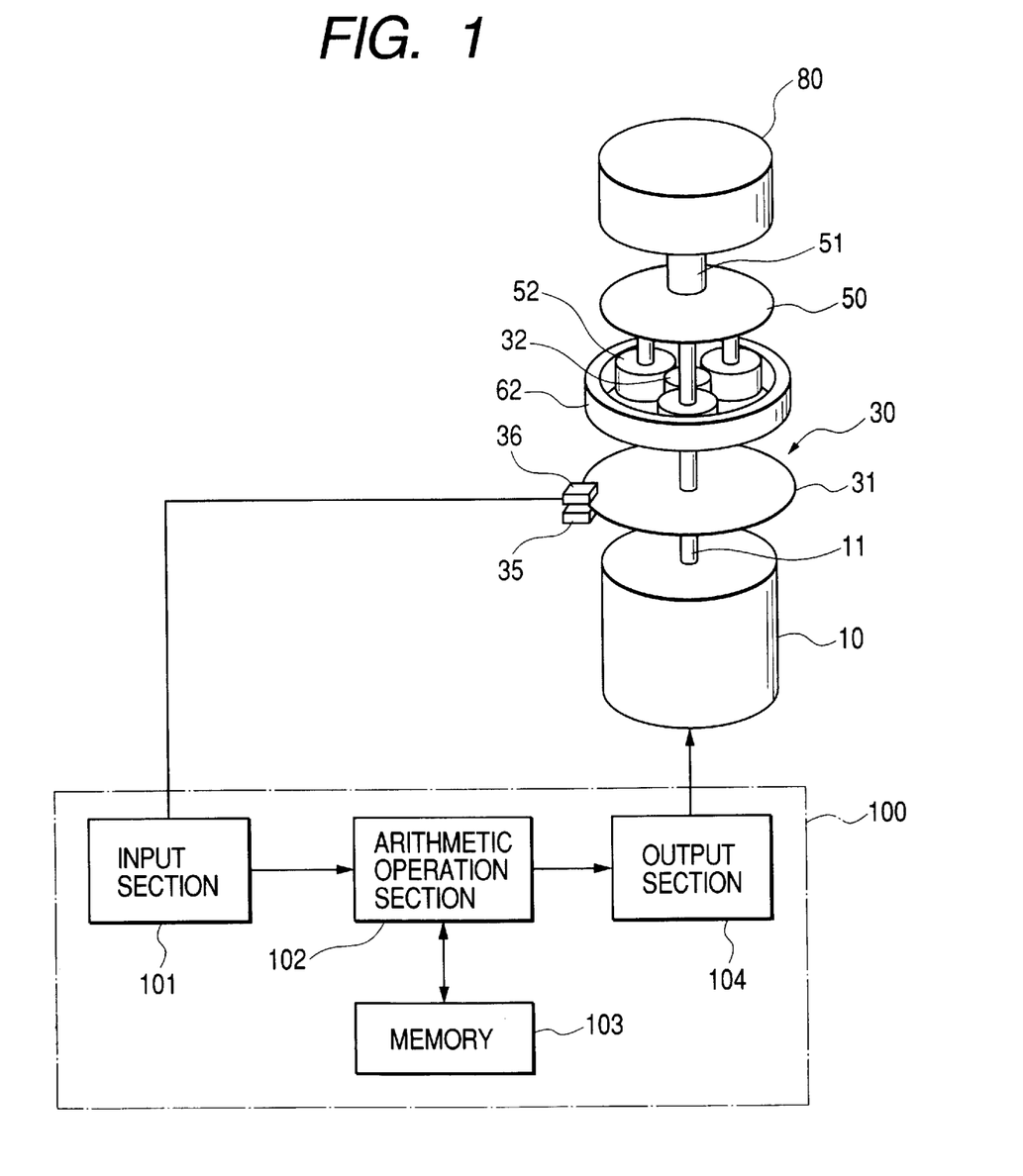
FIG. 1 is an explanatory view showing a basic constitution of the first embodiment of a manual inputting device of the present invention.
Figure 2:
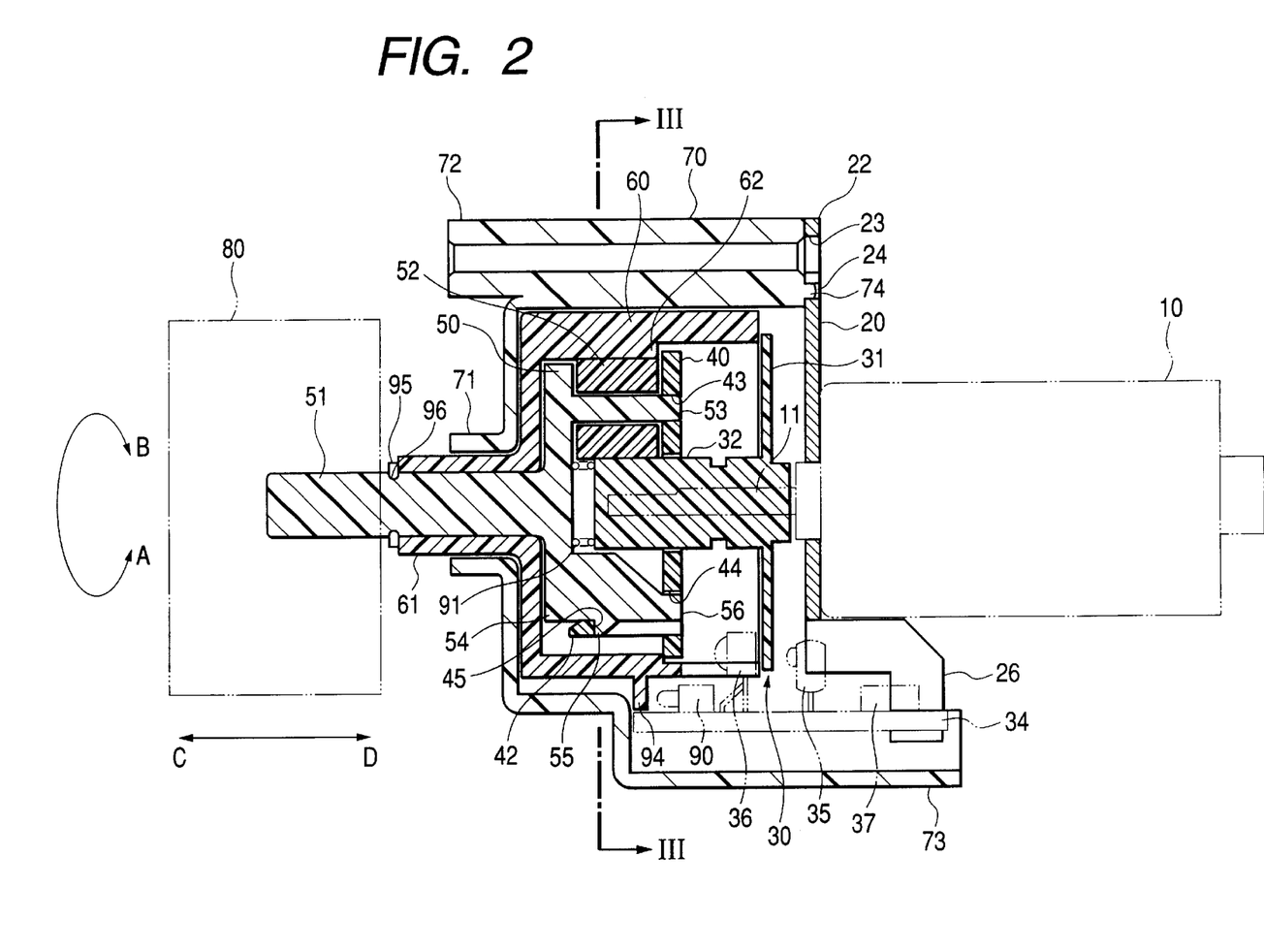
FIG. 2 is a transverse cross-sectional view showing an essential part of the first embodiment of the present invention.
Figure 3:
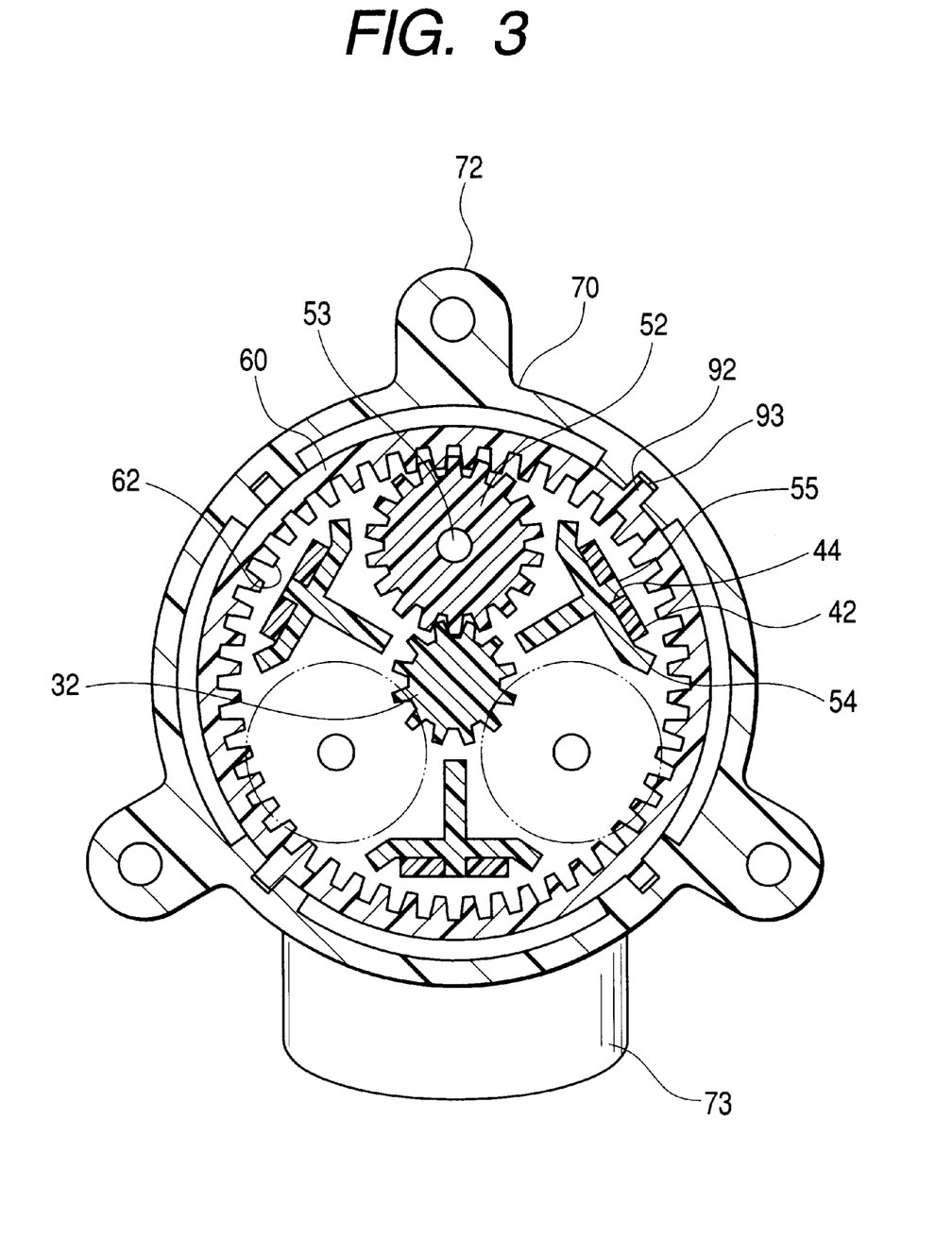
FIG. 3 is a cross-sectional view taken along a line III—III of FIG. 2.
Figure 4:
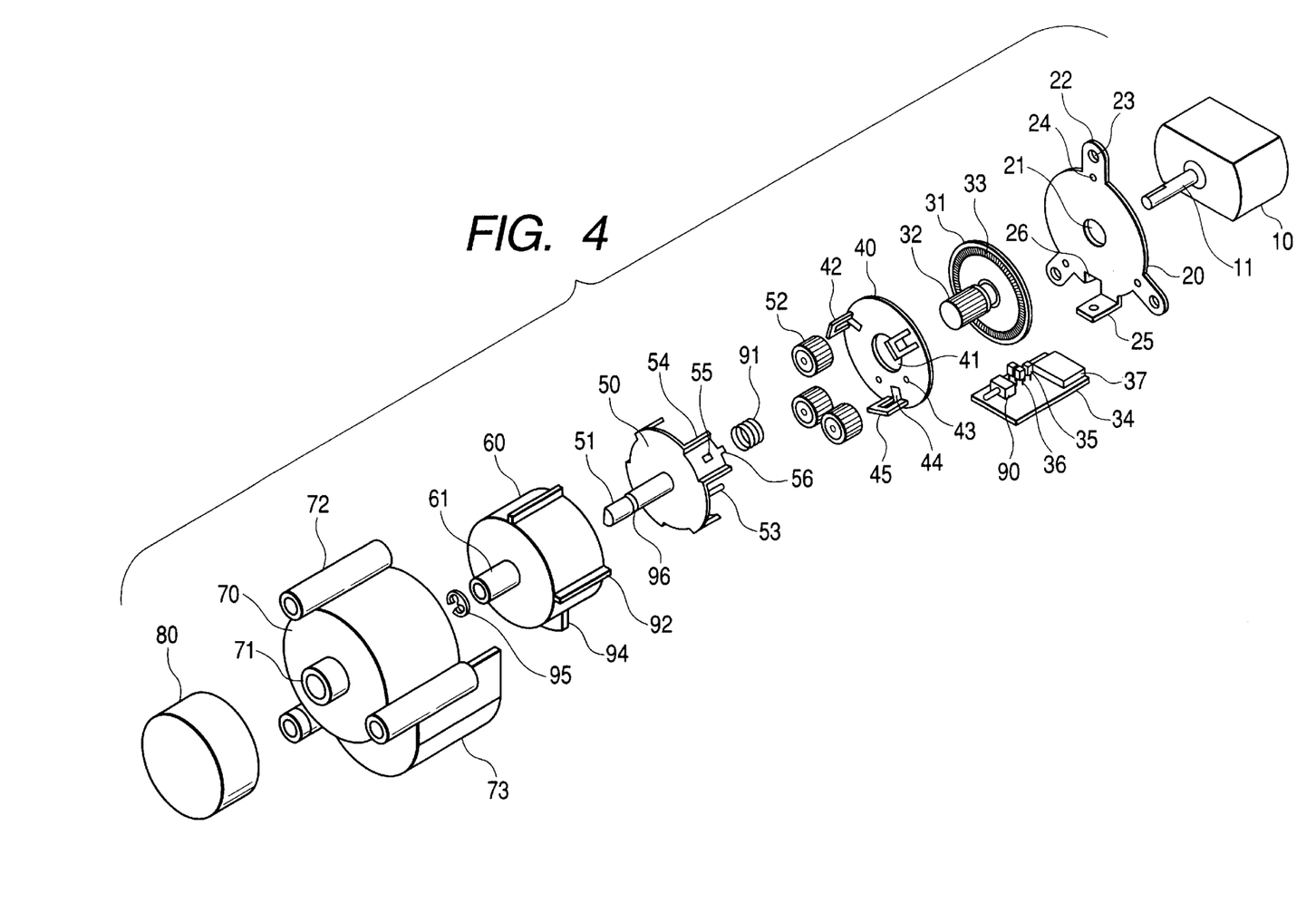
FIG. 4 is an exploded perspective view of an essential part shown in FIG. 2.

FIG. 1 is an explanatory view showing a basic constitution of the first embodiment, FIG. 2 is a transverse cross-sectional view showing an essential part of the first embodiment, FIG. 3 is a cross-sectional view taken along a line III—III of FIG. 2, and FIG. 4 is an exploded perspective view of an essential part shown in FIG. 2.

In view of the circumstance that when electric apparatuses such as an air conditioner, a radio, a television set, an audio set which are mounted on an automobile, for example, are manipulated by respectively different manipulation means, the driving of the automobile is hampered, in the same manner as the previously-mentioned prior art, the first embodiment is also directed to a manual inputting device which performs the temperature control of the air conditioner, the adjustment of a tuner of the radio, the adjustment of sound volume and sound quality of the television set, the radio and the audio set using a single manual inputting device, for example so as to prevent the interruption of driving.

As shown in FIG. 1, the manual inputting device according to the first embodiment includes a manipulating member such as knob 80 which is manually manipulated and transmits signals in response to a rotational direction and a rotational amount due to such a manual manipulation and a motor 10 which imparts a given manipulation feeling to the knob 80 in response to the rotational direction and the rotational amount due to the manual manipulation. Further, the manual inputting device includes a planetary gear mechanism having a sun gear 32, planet gears 52, a ring gear 62, a carrier 50 and a carrier shaft 51, detection means for detecting the rotation of an output shaft 11 of the motor 10, that is, an encoder 30, and control means for controlling the rotation of the motor 10 in response to a detection result of the encoder 30, that is, a control unit 100. Further, the sun gear 32 of the planetary gear mechanism is integrally mounted on the output shaft 11 of the motor 10, while the knob 80 is integrally mounted on the carrier shaft 51 of the planetary gear mechanism.

The control unit 100 has the constitution equal to the control unit of the previously-mentioned prior art. However, in view of the importance of the control unit 100, the explanation of the control unit 100 is repeated again here.

The control unit 100 includes an input section 101 to which detection signals outputted from a light receiving section 36 are inputted, a memory 103 which prestores control signals corresponding to the detection signals in a form of a table, an arithmetic operation section 102 which reads out control signals stored in the memory 103 in response to the detection signals, and an output section 104 which outputs the control signals read out from the arithmetic operation section 102 to the motor 10.

As shown in FIG. 2 and FIG. 4, the encoder 30 is constituted of a code plate 31, a light emitting section 35, the light receiving section 36, a connector 37 which is connected to the above-mentioned control unit 100 and a board 34 on which the light emitting section 35, the light receiving section 36 and the connector 37 are mounted. A plurality of slits 33 are formed in the code plate 31 along a circumference thereof. Upon receiving light which is emitted from the light emitting section 35 and passes through the slit 33, the light receiving section 36 outputs detection signals corresponding to the rotational direction and the rotational amount of the knob 80.

As shown in FIG. 2 to FIG. 4, the planetary gear mechanism includes, as mentioned previously, the sun gear 32, the planet gears 52, the ring gear 62, the carrier 50 and the carrier shaft 51. The teeth ratio between the sun gear 32 and the ring gears 62 is set to 1:5, for example.

The sun gear 32 is coaxially and integrally mounted on the above-mentioned code plate 31. Three planet gears 52 are arranged between a restricting member 40 and the carrier 50. The carrier 50 is provided with three planet gear shafts 53 which rotatably support respective planet gears 52, the carrier shaft 51 and joint portions 54 which joint the carrier 50 to the restricting member 40. The restricting member 40 is constituted of a disk-like member and is provided with an insertion hole 41 which allows the sun gear 32 to pass therethrough, support holes 43 which support respective planet gear shafts 53 and joint portions 42 which respectively correspond to the joint portions 54 of the carrier 50. The restricting member 40 is provided for restricting the axial movement of the planet gears 52 in the state that they are jointed to the carrier 50.

Engaging holes 45 are formed in the joint portions 42 of the restricting member 40 and fitting holes 44 are formed in lower portions of the joint portion 42. On the other hand, the engaging portions 54 of the carrier 50 are provided with pawls 55 which are engaged with the engaging holes 45 and fitting projections 56 which are fitted into the fitting holes 44. That is, the restricting member 40 and the carrier 50 are engaged with each other in a snap-fit engagement in the state that the relative axial movement between them is restricted.

As shown in FIG. 2 to FIG. 4, the ring gear 62 is formed in the inside of a fixing member which always fixes the ring gear 62, that is, a cylindrical ring gear casing 60. That is, the ring gear 62 is integrally formed on an inner peripheral surface of the ring gear casing 60. In the inside of the ring gear casing 60, the above-mentioned restricting member 40, planet gear 52 and carrier 50 are accommodated. Further, the ring gear casing 60 is provided with a carrier shaft insertion portion 61 which allows an insertion of the carrier shaft 51.

As shown in FIG. 2 to FIG. 4, a body casing 70 is provided with screw insertion portions 72 which allow an insertion of screws not shown in the drawing on an outer peripheral portion of an cylindrical member. The body casing 70 is also provided with a carrier shaft insertion portion 71 which allows the insertion of the carrier shaft 51 along with the above-mentioned carrier shaft insertion portion 61 and a base plate accommodating portion 73 which accommodates the above-mentioned board (or base plate) 34. Further, projecting portions 74 are formed on a peripheral portion which defines an opening of the body casing 70 in the vicinity of respective screw insertion portions 72.

The knob 80 is integrally mounted on the above-mentioned carrier shaft 51 which passes through the carrier shaft insertion portion 71 of the body casing 70.

As shown in FIG. 2 to FIG. 4, the motor 10 has the output shaft 11 thereof fixed to the above-mentioned sun gear 32 and is fixed to the body casing 70 by way of a bracket 20. The bracket 20 is provided with fastening portions 22 corresponding to respective screw insertion portions 72 of the body casing 70. Screw insertion holes 23 and small holes 24 which allow the insertion of the above-mentioned respective projections 74 are formed in the fastening portions 22. Further, the bracket 20 is also provided with mounting portions 25, 26 for mounting the above-mentioned board 34 thereon.

Further, according to the first embodiment, as shown in FIG. 2 to FIG. 4, the manual inputting device includes guide means which supports the knob 80 in a state that the knob 80 is movable in the axial direction, biasing means which biases the knob 80 in the axial direction and a switch manipulation portion 94 which operates a given switch, that is, a push switch 90 in response to the movement of the knob 80 against the biasing means.

As shown in FIG. 2 to FIG. 4, the push switch 90 is formed on the knob 80-side of the above-mentioned board 34.

As shown in FIG. 3 and FIG. 4, the guide means is constituted of slide projecting portions 92 which are formed in the axial direction on the outer peripheral surface of the ring gear casing 60 at four positions and slide recesses 93 which are formed in an inner peripheral surface of the body casing 70 at positions corresponding to the slide projecting portions 92.

As shown in FIG. 2 and FIG. 4, the biasing means is constituted of a return spring 91 which is disposed between the carrier 50 and the sun gear 32 and biases the knob 80 by way of the carrier 50.

The switching manipulation portion 94 is constituted of a plate-like portion which is formed on the outer peripheral surface of the ring gear casing 60 and is projected from the outer peripheral surface.

Further, as shown in FIG. 2, the carrier shaft 51 is made to pass through the carrier shaft insertion portion 61 of the ring gear casing 60. Further, in the state that the carrier shaft 51 and the carrier shaft insertion portion 61 are made to pass through the carrier shaft insertion portion 71 of the case body 70, a ring pin (retainer ring) 95 is mounted in a groove 96 formed in the carrier shaft 51 thus restricting the axial movement of the carrier shaft 51.

In the first embodiment having such a constitution, as shown in FIG. 2, when the knob 80 is rotated in the clockwise direction, for example, that is, when the knob 80 is rotated in the direction A, the carrier shaft 51, that is, the carrier 50 which is rotated integrally with the knob 80 is rotated in the clockwise direction. Here, since the ring gear 62 is always fixed to the ring gear casing 60, respective planet gears 52 revolve in the clockwise direction about the sun gear 32 while rotating in the counterclockwise direction. Then, the rotation of the planet gears 52 is transmitted to the sun gear 32 so that the sun gear 32 is rotated in the clockwise direction. On the other hand, when the knob 80 is rotated in the counterclockwise direction, that is, in the direction B, the sun gear 32 is rotated in the counterclockwise direction.

Here, the rotation of the sun gear 32 is increased with respect to the carrier shaft 51, that is, the knob 80 which is integrally rotated with the carrier shaft 51 corresponding to the teeth number ratio between the sun gear 32 and the ring gear 62. Accordingly, the resolution of the rotational amount of the knob 80 is enhanced. In the encoder 30, the light receiving section 36 receives light which is emitted from the light emitting section 35 and passes through the slit 33 and the rotation of the output shaft 11 of the motor 10 is-detected based on the rotation of the code plate 31 which is integrally formed with the sun gear 32. In this first embodiment, since the teeth number ratio between the sun gear 32 and the ring gear 62 is set to 1:5, the resolution of the rotational amount of the knob 80 is increased five times.

Subsequently, detection signals corresponding to the rotational direction and the rotational amount detected in the above-mentioned manner are outputted from the light receiving section 36 and are inputted to the input section 101 of the control unit 100. In the arithmetic operation section 102, control signals in response to the detection signals are read out from the memory 103. The control signals are outputted to the motor 10 from the output section 104 and hence, a rotational force is outputted from the output shaft 11 of the motor 10.

The rotational force in the counterclockwise direction, for example, outputted from the output shaft 11 of the motor 10 is transmitted to the planet gears 52 by way of the sun gear 32. Here, since the ring gear 62 is always fixed to the ring gear casing 60, the rotational force is applied to respective planet gears 52 in the counterclockwise revolving direction about the sun gear 32 as well as in the clockwise rotational direction about their axes. Accordingly, the rotational force in the counterclockwise direction is applied to the carrier 50, that is, the carrier shaft 51.

The rotational force of the carrier shaft 51 is increased with respect to the rotational force of the sun gear 32, that is, the rotational force of the output shaft 11 of the motor 10 which is integrally rotated with the sun gear 32 corresponding to the teeth number ratio between the sun gear 32 and the ring gear 62. The rotational force in the counterclockwise direction which is increased in the above-mentioned manner is applied to the knob 80. On the other hand, when the rotational force of the output shaft 11 of the motor 10 is in the clockwise direction, the rotational force in the clockwise direction is applied to the knob 80.

With respect to the knob 80 to which the rotational force is applied in the above-mentioned manner, when a manipulator turns the knob 80 in the direction A to increase the sound volume at the time of adjusting the volume of a radio, for example, the rotational force in the direction against the direction A is applied to the knob 80 by the motor 10 so that a feeling of resistance is imparted to the manipulator. On the other hand, when the knob 80 is rotated in the direction B to decrease the sound volume, the rotational force in the direction equal to the direction B is applied to the knob 80 by the motor 10 so that a feeling of acceleration is imparted to the manipulator. Accordingly, the manipulator can receive a feeling of manipulation corresponding to the rotational direction and the rotational amount of the knob 80.

Further, according to the first embodiment, due to a spring force of the return spring 91 disposed between the sun gear 32 and the carrier 50, the carrier 50 is always biased to the knob 80 side. The carrier 50 has a boundary thereof between the carrier 50 and the carrier shaft 51 brought into pressure contact with the ring gear casing 60 so that the ring gear casing 60 is brought into pressure contact with a knob 80-side inner wall surface of the body casing 70. Accordingly, the knob 80 is always biased in the direction C.

Then, when the knob 80 is pushed in the direction D, the carrier 50 is moved against the return spring 91. Here, the ring pin 95 mounted on the carrier shaft 51 pushes an end of the carrier shaft insertion portion 61 of the ring gear casing 60. Accordingly, the ring gear casing 60 is integrally moved with the carrier 50 while being guided by the slide projecting portions 92 and the slide recesses 93. When the ring gear casing 60 is moved in this manner, the switch manipulation part 94 which is formed integrally with the ring gear casing 60 is moved so that the push switch 90 is pushed by the switch manipulation part 94 whereby the switch is operated.

When the knob 80 is released from the pushing force, the carrier 50 is pushed by the return spring 91 and returns to an original position along with the ring gear casing 60. Accordingly, the switch manipulation part 94 is shifted away from the push switch 90 so that the switch becomes inoperable.

In this manner, according to the first embodiment, in response to the rotational direction and the rotational amount of the knob 80, the rotational force in the same direction or the opposite direction is transmitted to the knob 80 by the motor 10 and hence, a given feeling of manipulation such as the feeling of resistance or the feeling of acceleration can be imparted to the manipulator. Accordingly, when the manipulator cannot focus or direct his attention to other places while driving the automobile, the manipulator can grasp the content of the manipulation with the knob 80 without watching the knob with naked eyes. Accordingly, the manual inputting device can exhibit the excellent operability.

Further, in this embodiment, since the motor 10, the planetary gear mechanism, the encoder 30 and the knob 80 can be arranged on the same axis, it is possible to assemble the hole manual inputting device in a compact structure. Accordingly, it is possible to make the manual inputting device small-sized and light-weighted. Particularly, since the miniaturization can be realized, the manual inputting device can be suitably mounted in a limited space inside an automobile or the like.

Further, when the rotation of the knob 80 is transmitted to the output shaft 11 of the motor 10, the resolution of the rotational amount of the knob 80 can be increased with the use of the planetary gear mechanism. Further, when the knob 80 is driven, the rotational force is applied to the knob 80 such that the torque outputted from the motor 10 is increased by the planetary gear mechanism. That is, with the use of the planetary gear mechanism, the increase of the torque outputted from the motor 10 and the enhancement of the resolution of the rotational amount of the knob 80 can be achieved with the compact structure. Accordingly, it is also possible to make the manual inputting device small-sized and light-weighted from this aspect.

The inventors have confirmed that due to the transmission of the rotational force of the motor 10 to the knob 80 after increasing the rotational force by way of the planetary gear mechanism, the rotational force of the motor 10 can be reduced to equal to or less than ½ of the rotational force of the above-mentioned prior art. Accordingly, it is possible to mount a motor having a size smaller than that of the above-mentioned prior art.

The inventors also have confirmed that along with such miniaturization and reduction of weight, this embodiment can reduce the volume of the manual inputting device to equal to or less than ½ and the weight to equal to or less than ¼ compared to the previously-mentioned prior art. Accordingly, the manual inputting device of this embodiment is suitable for being mounted in a limited space such as a space in the inside of an automobile.

Further, according to the first embodiment, the push switch 90 is operated by pushing the knob 80 and hence, the knob 80 can be used as a push button switch whereby the number of apparatuses which can be handled by a single manual inputting device can be increased.

Further, although the knob 80 is used as the manipulating member in the first embodiment, the present invention is not limited to the knob and a lever or the like can be used as the manipulating member.

A second embodiment of a manual inputting device of the present invention is explained in conjunction with drawings.

Figure 5:
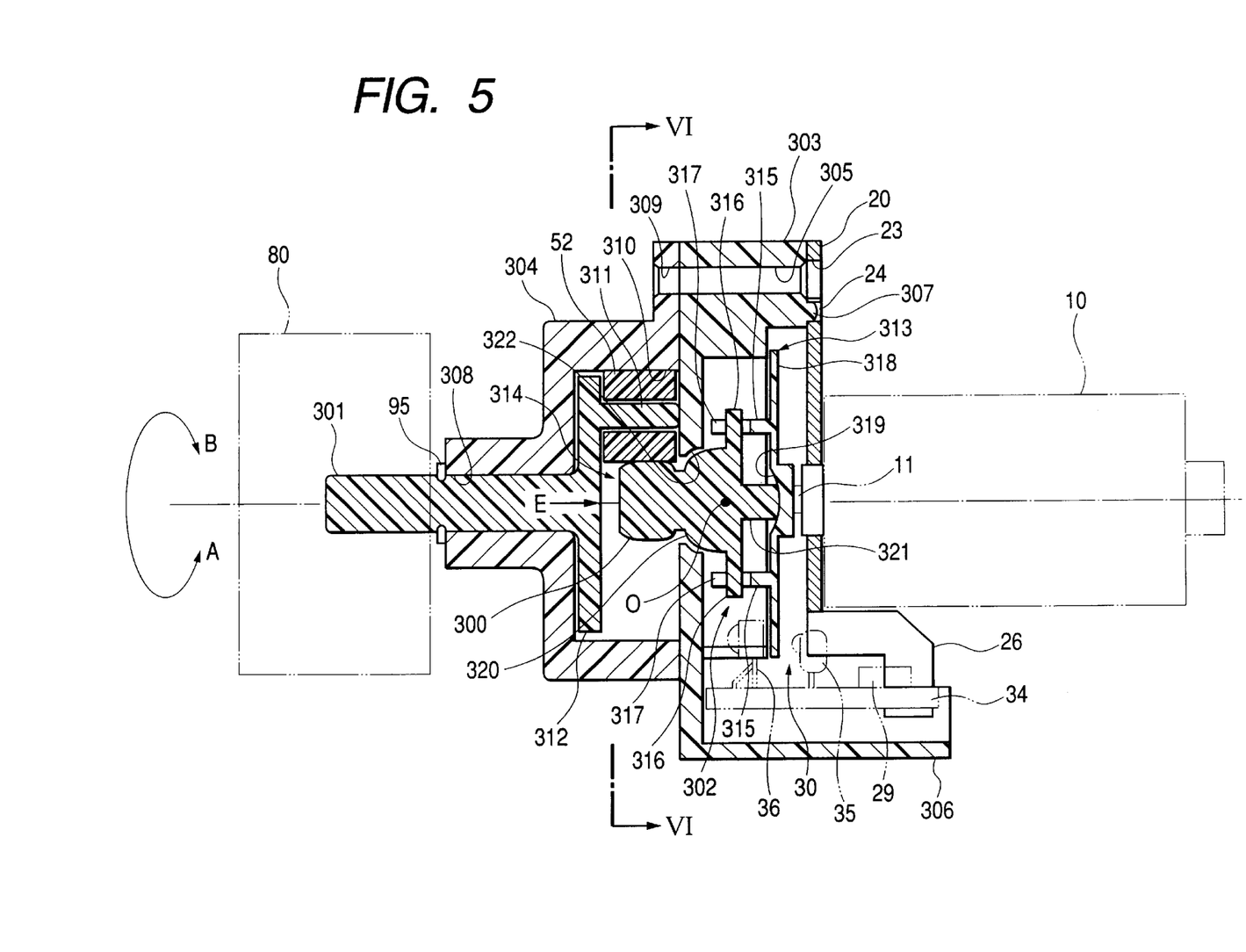
FIG. 5 is a longitudinal cross-sectional view showing an essential part of the second embodiment of the present invention.
Figure 6:
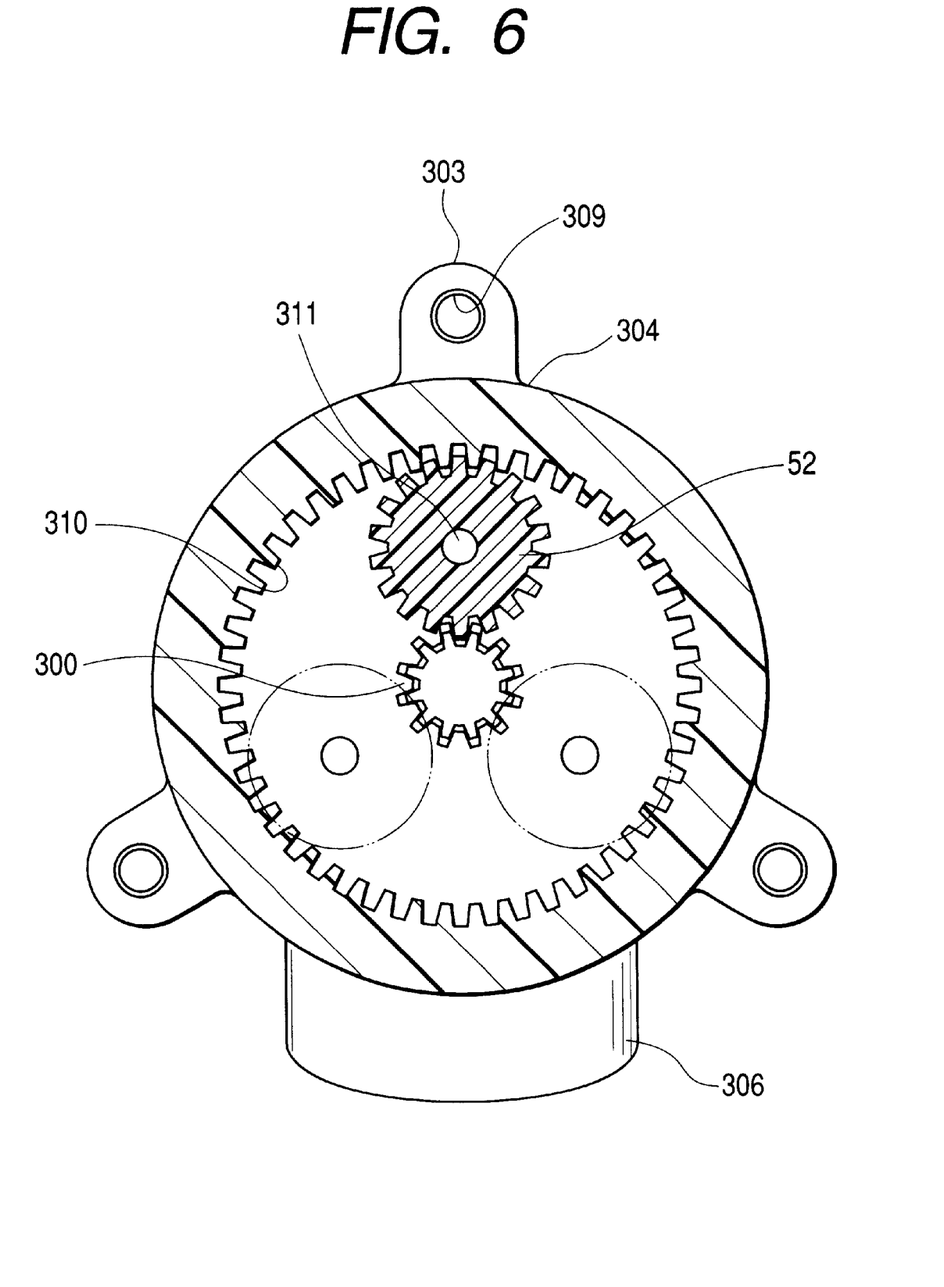
FIG. 6 is a cross-sectional view taken along a line VI—VI of FIG. 5.
Figure 7:
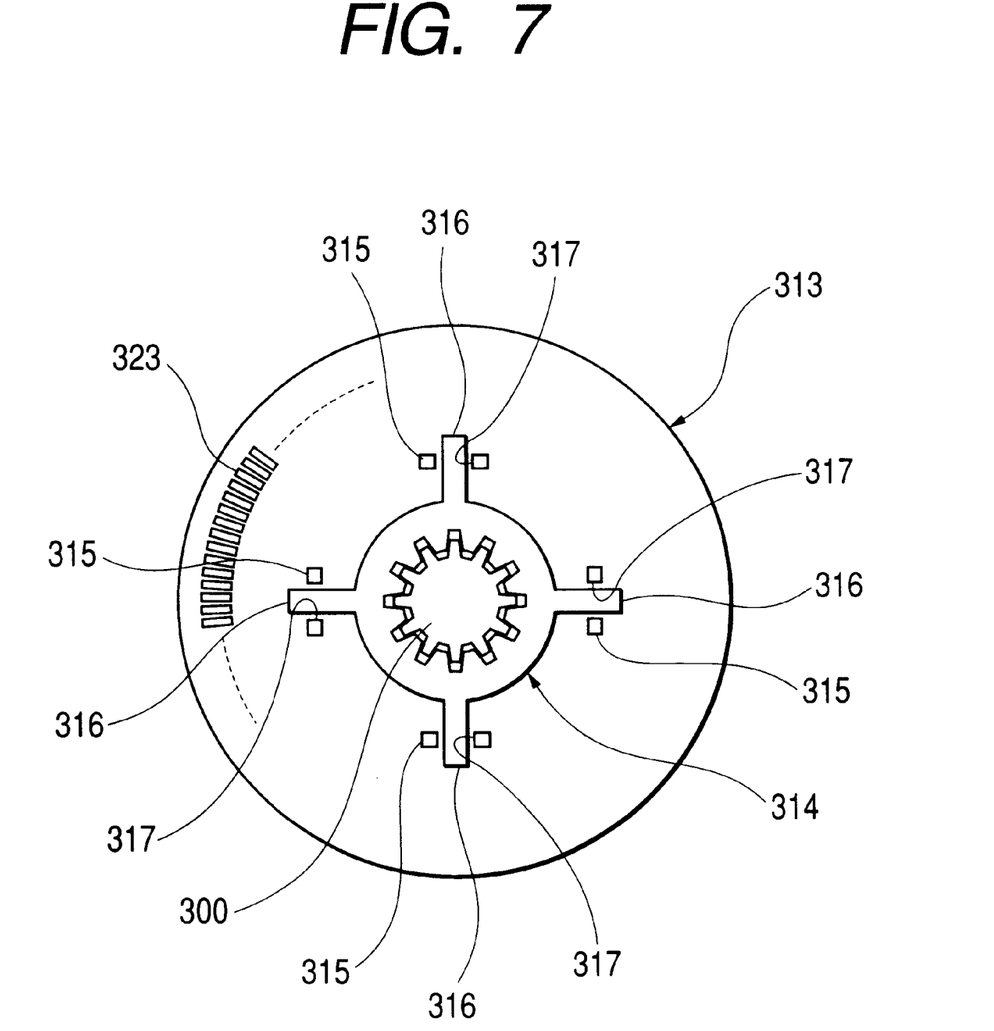
FIG. 7 is a view as viewed from E of a first rotary body and a second rotary body shown in FIG. 5.
Figure 8:
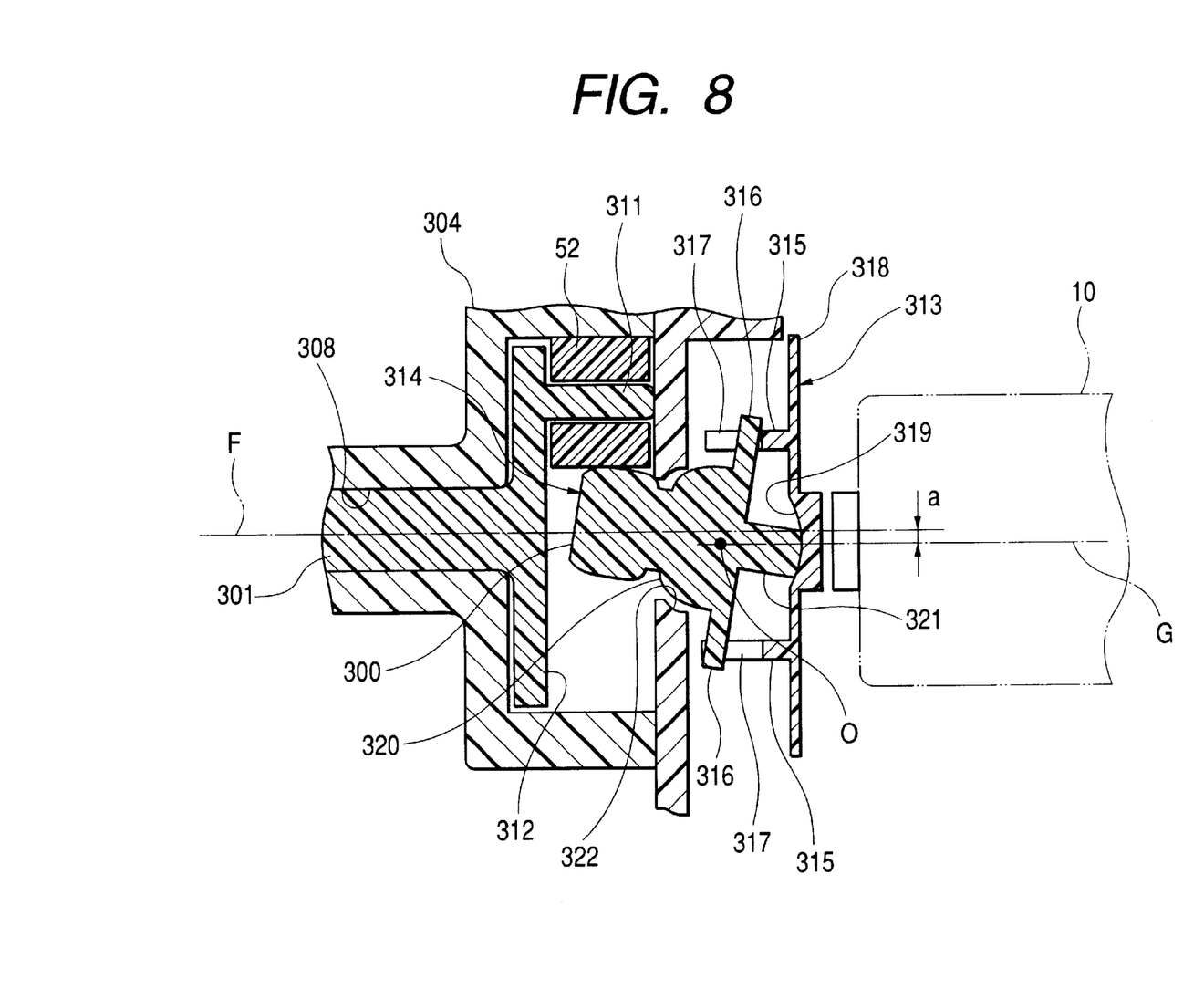
FIG. 8 is a longitudinal cross-sectional view showing a state in which meshing of a sun gear and planet gears is adjusted.

FIG. 5 is a longitudinal cross-sectional view showing an essential part of the second embodiment, FIG. 6 is a cross-sectional view taken along a line VI—VI of FIG. 5, FIG. 7 is a view showing a first rotary body and a second rotary body shown in FIG. 5 as viewed in the arrow direction from E, and FIG. 8 is a longitudinal cross-sectional view showing the state in which meshing of a sun gear and planet gears is adjusted. In FIG. 5 to FIG. 8, parts identical with the parts of the first embodiment are indicated by the same numerals.

In view of the circumstance that when electric apparatuses such as an air conditioner, a radio, a television set, an audio set and the like which are mounted on an automobile, for example, are manipulated by respectively different manipulation means, the driving of the automobile is hampered, in the same manner as the previously-mentioned prior art, the second embodiment is also directed to a manual inputting device which performs the temperature control of the air conditioner, the adjustment of a tuner of the radio, the adjustment of sound volume and sound quality of the television set, the radio and the audio set using a single manual inputting device, for example, so as to prevent the interruption of driving.

As shown in FIG. 5, the manual inputting device according to the second embodiment includes a manipulating member such as a knob 80 which is rotatably manipulated and transmits signals in response to the rotational direction and the rotational amount due to such a rotational manipulation and a motor 10 which imparts a given manipulation feeling to the knob 80 in response to the rotational direction and the rotational amount due to the rotational manipulation.

Further, in the second embodiment, the manual inputting device includes a planetary gear mechanism which outputs the rotational force inputted to a sun gear 300 from the motor 10 from a carrier shaft 301 and imparts the rotational force to the knob 80, and an adjusting means 302 which can adjust meshing of the sun gear 300 and the planet gears 52 of the planetary gear mechanism.

Further, in the second embodiment, as shown in FIG. 1, the manual inputting device includes a detection means, that is, an encoder 30 which detects a rotational direction and a rotational amount of an output 11 of the motor 10 and a control means, that is, a control unit 100 which controls the rotation of the motor 10 in response to a detection result of the encoder 30.

As shown in FIG. 5, the manual inputting device of the second embodiment further includes a first casing 303 in which the above-mentioned adjusting means 302 and the above-mentioned encoder 30 are accommodated and a second casing 304 in which the above-mentioned planetary gear mechanism is accommodated.

As shown in FIG. 5, the motor 10 is fixed to the first case 303 by way of a bracket 20 such that the output shaft 11 of the motor 10 is arranged in the inside of the first case 303. Further, the first case 303 includes screw insertion portions 305 which allow an insertion of screws not shown in the drawing and a board accommodating portion 306 which accommodates a board 34 on which a light emitting portion 35 and a light receiving portion 36 provided to the encoder 30 are mounted. Further, in the vicinity of respective screw insertion portions 305 at an opening side of the first case 303, projections 307 which are inserted into small holes 24 formed in the bracket 20 and position a bracket 20 are provided.

The bracket 20 is provided with screw insertion portions 23 corresponding to the screw insertion portions 305 of the first case 303. In the vicinity of the screw insertion portions 23, the above-mentioned small holes 24 are formed. Further, the bracket 20 is also provided with fixing portions 26 which fix the above-mentioned board 34.

A carrier shaft insertion portion 308 which allows insertion of the carrier shaft 301 of the planetary gear mechanism is mounted in the second casing 304. The knob 80 is fixed to the carrier shaft 301 which is made to pass through the carrier shaft insertion portion 308. A ring pin (retainer ring) 95 is mounted on the carrier shaft 301 in the vicinity of an opening portion of a carrier shaft insertion portion 308 thus restricting the movement of the carrier shaft 301 to the second casing 304 side. Further, screw insertion portions 309 which correspond to the screw insertion portions 305 mounted on the first casing 303 are formed on the second casing 304. Screws not shown in the drawing are inserted into these screw insertion portions 305, 309 so as to fasten the first casing 303 and the second casing 304.

As shown in FIG. 5 and FIG. 6, the planetary gear mechanism includes a sun gear 300 to which the rotational force from the output shaft 11 of the motor 10 is inputted, a plurality of, that is, for example, three planet gears 52 which mesh with the sun gear 300 and revolve about the sun gear 300, a ring gear 310 which has an inner peripheral side thereof meshed with the planet gear 52, a carrier 312 which has three planet gear shafts 311 which rotatably support respective planet gears 52 and is integrally rotated with the revolving planet gears 52, and a carrier shaft 301 which outputs the rotational force of the carrier 312 to the knob 80. The teeth number ratio between the sun gear 300 and the ring gear 310 is set to 1:5, for example. The ring gear 310 is fixed to an inner wall of the second casing 304 so as to always fix the ring gear 310.

As shown in FIG. 5 and FIG. 7, the adjusting means 302 includes the sun gear 300 which is formed in a barrel shape, a first rotary body 313 which is fixed to the output shaft 11 of the motor 10 and a second rotary body 314 which has the sun gear 300 fixed thereto and is integrally rotated with the first rotary body 313. Further, the manual inputting device makes the first rotary body 313 and the second rotary body 314 engage with each other such that the second rotary body 314 is tiltably supported and also makes the first rotary body 313 and the second rotary body 314 engage with each other such that the first rotary body 313 and the second rotary body 314 are integrally rotated.

As shown in FIG. 5 and FIG. 7, the engaging means includes first engaging elements 315 which are angularly arranged at four portions of the first rotary body 313 every 90 degrees and equidistantly from the center of rotation of the first rotary body 313 and four second engaging elements 316 which are formed on the second rotary body 314 and engage with the first engaging elements 315. The first engaging elements 315 include notches 317 in which second engaging elements 316 are arranged. Here, the first engaging elements 315 and the second engaging elements 316 restrict the relative movement in the circumferential direction about the center of rotation.

A code plate 318 and the above-mentioned first engaging element 315 are integrally formed on the first rotary body 313. Further, a recess 319 having a spherical shape whose center is disposed at the tilting center O of the second rotary body 314 is formed at the center of the first rotary body 313.

Further, the second rotary body 314 includes the sun gear 300, a semispherical portion 320 which is integrally formed with the sun gear 300, the above-mentioned second engaging element 316 which is formed on a skirt portion of the semispherical portion 320, and a projection 321 which is provided at the center of rotation of the second rotary body 314 and is brought into slide contact with the recess 319 formed in the first rotary body 313. Here, the first casing 303 is provided with a restriction hole 322 which restricts the movement of the semispherical portion 320 of the second rotary body 314 toward the second casing 304.

In the manual inputting device of the second embodiment having such a constitution, as shown in FIG. 5, when the knob 80 is rotated in the direction A which is the clockwise direction, for example, the carrier shaft 301, that is, the carrier 312 is rotated in the clockwise direction. Since the ring gear 310 is always fixed to the second casing 304, the respective planet gears 52 revolves in the clockwise direction about the sun gear 300 while rotating in the counterclockwise direction along with the rotation of the carrier 312 in the clockwise direction. Accordingly, the sun gear 300 is rotated in the clockwise direction. On the other hand, when the knob 80 is rotated in the counterclockwise direction, that is, in the direction B, the sun gear 300 is rotated in the counterclockwise direction.

The rotational speed of the sun gear 300 which is rotated in such a manner is a rotational speed which is obtained by increasing the rotational speed of the carrier shaft 301 based on the teeth number ratio of the sun gear 300 and the ring gear 310. Since the output shaft 11 of the motor 10 is integrally rotated with the sun gear 300 by way of the second rotary body 314 and the first rotary body 313, the resolution of the rotational amount of the knob 80 is enhanced. In the second embodiment, since the teeth number ratio of the sun gear 300 and the ring gear 310 is set to 1:5, the resolution of the rotational amount of the knob 80 is increased five times.

Then, with respect to the encoder 30, when the light receiving section 36 receives light which is emitted from the light emitting section 35 and passes through the slit 323 of the code plate 318, the rotational direction and the rotational amount of the output shaft 11 of the motor 10 are detected. The light receiving section 36 outputs detection signals corresponding to the detected rotational direction and the rotational amount and the detection signals are inputted to the input section 101 of the control unit 100. In the arithmetic operation section 102, control signals corresponding to the detection signals are read out from the memory 103. The control signals are outputted from the outputting section 104. The motor 10 outputs a rotational force in the counterclockwise direction, for example, from the output shaft 11 in response to the control signals.

The rotational force in the counterclockwise direction is inputted to the sun gear 300 by way of the first rotary body 313 and the second rotary body 314. Since the ring gear 310 is always fixed to the second casing 304, along with the inputting of the rotational force to the sun gear 300, a rotational force in the direction which makes the respective planet gears 52 rotate in the clockwise direction and revolve in the counterclockwise direction about the sun gear 300 is given to the respective planet gears 52. Accordingly, a rotational force in the counterclockwise direction is imparted to the carrier 312 and a rotational force in the counterclockwise direction is outputted from the carrier shaft 301.

The rotational force outputted from the carrier shaft 301 is a rotational force which is obtained by increasing the rotational force of the sun gear 300 by making use of the teeth number ratio of the sun gear 300 and the ring gear 310. In the second embodiment, since the teeth number ratio of the sun gear 300 and the ring gear 310 is set to 1:5, the rotational force inputted to the sun gear 300 is increased five times, is outputted from the carrier shaft 301 and is imparted to the knob 80. Accordingly, when the manipulator turns the knob 80 in the clockwise direction, it is possible to give a feeling of resistance to the manipulator as a feeling of manipulation. On the other hand, when the rotational force in the direction equal to the direction of the rotary manipulation is imparted to the knob 80, it is possible to give a feeling of acceleration to the manipulator as a feeling of manipulation.

With respect to the knob 80 to which the rotational force is applied in the above-mentioned manner, when the manipulator turns the knob 80 in the direction A to increase the sound volume at the time of adjusting the volume of a radio, for example, the rotational force in the direction against the rotational direction of the knob 80 is applied to the knob 80 by the motor 10 so that a feeling of resistance can be imparted to the manipulator. On the other hand, when the knob 80 is rotated in the direction B to decrease the sound volume, the rotational force in the direction equal to the rotational direction of the knob 80 is applied to the knob 80 by the motor 10 so that a feeling of acceleration is imparted to the manipulator. Accordingly, the manipulator can receive a feeling of manipulation corresponding to the rotational direction and the rotational amount of the knob 80.

The manual inputting device of the second embodiment is further provided with an adjusting means 302. This adjusting means 302 is explained hereinafter.

In the second embodiment, to have the sun gear 300, the planet gears 52 and the ring gear 310 meshed each other while absorbing the tolerances among respective parts, it is necessary to provide plays among the sun gear 300, the planet gears 52 and the ring gear 310. However, there may be a case where the transmission efficiency of the rotational force between the motor 10 and the knob 80 is worsened because of the occurrence of a backlash derived from the plays.

Accordingly, as shown in FIG. 8, for example, when the output shaft 11 of the motor 10 and the carrier shaft 301 are displaced from each other in the vertical direction by a size "a" due to play between these components, the position of the sun gear 300 is moved by means of the adjusting means 301 such that the sun gear 300 and the planet gears 52 are properly meshed with each other.

That is, in this case, the second rotary body 314 is tilted about the center of tilting O toward the center axis F of revolution of the planet gears 52. Here, since the sun gear 300 has a barrel shape, even when the center axis G of rotation of the sun gear 300 is displaced by the dimension "a" with respect to the center axis F of revolution of the planet gears 52, the sun gear 300 is meshed with the planet gears 52 and hence, the displacement by the dimension "a" is eliminated.

Here, the second engaging elements 316 shown in FIG. 8 are moved within the notches 317 formed in the first engaging elements 315 corresponding to the tilting angle of the second rotary body 314. With respect to two remaining engaging elements 316 not shown in FIG. 8, they constitute the tilting axis, that is, the center O of tilting of the second rotary body 314.

Further, the projection 321 of the second rotary body 314 slides on the recess 319 corresponding to a tilted angle of the second rotary body 314. Accordingly, the force in the rotary axis direction imparted to the sun gear 300 is received by the first rotary body 313 so that the movement of the sun gear 300 in the direction toward the center G of rotation can be restricted.

In the adjusting means 302, at the time of assembling the sun gear 300, the planet gears 52 and the ring gear 310 while absorbing the tolerance of respective parts by providing plays among the sun gear 300, the planet gears 52 and the ring gear 310, the meshing between the sun gear 300 and the planet gears 52 can be adjusted thus preventing the occurrence of the excessive backlash due to play between components whereby the high transmission efficiency can be ensured between the knob 80 and the output shaft 11 of the motor 10.

In this manner, according to the present invention, in response to the rotational direction and the rotational amount of the knob 80, the rotational force in the direction equal to or opposite to the direction of the knob 80 is imparted to the knob 80 from the motor 10. Accordingly, it is possible to give the manipulator a given feeling of manipulation such as the feeling of resistance or the feeling of acceleration. Accordingly, when the manipulator cannot focus or direct his attention to other places while driving the automobile, the manipulator can grasp the content of the manipulation with the knob 80 without watching the knob with naked eyes. Accordingly, the manual inputting device can exhibit excellent operability.

Further, in the second embodiment, the sun gear 300 and the planet gears 52 can be adjusted into the properly meshed state by the adjusting means 302 and hence, the occurrence of the excessive backlash derived from play between components can be prevented whereby the high transmission efficiency can be ensured between the knob 80 and the output shaft 11 of the motor 10. That is, it is possible to ensure the high transmission efficiency between the knob 80 and the output shaft 11 of the motor 10 without making the tolerance of respective parts small for enhancing the working accuracy and hence, the cost can be reduced.

Further, in the second embodiment, the first rotary body 313 and the second rotary body 314 are engaged with each other by means of the first and second engaging elements 315, 316. Accordingly, while supporting the sun gear 300 in a tiltable manner, the rotational force outputted from the output shaft 11 of the motor 10 can be surely inputted to the sun gear 300 and hence, the lowering of the transmission efficiency of the rotational force transmitted from the output shaft 11 to the sun gear 300 can be prevented.

Further, in this embodiment, the recess 319 is formed in the first rotary body 313 and the projection 321 is formed on the second rotary body 314. Accordingly, the force in the direction toward the center of rotation imparted to the sun gear 300 is received by the first rotary body 313 and the movement of the sun gear 300 in the direction toward the center of rotation is restricted and hence, it is possible to hold the sun gear 300 and the planet gears 52 in the properly meshed state whereby the malfunction of the sun gear 300 and the planet gears 52 can be prevented.

Further, in the second embodiment, the code plate 318 is integrally formed with the first rotary body 313 and hence, the number of parts can be reduced so that the cost can be reduced.

As has been described heretofore, according to the present invention, while it is possible to obtain the excellent operability by imparting a given feeling of manipulation to the manipulator, the whole manual inputting device can be arranged in a compact form by arranging the motor, the planetary gear mechanism, the detection means and the manipulation means on the same axis. Accordingly, the miniaturization and the reduction of weight can be realized. Particularly, since the miniaturization is possible, it is suitable for mounting the manual inputting device in a limited space.

Further, in detecting the rotation of the manipulating member, the resolution of the rotational amount of the manipulating member can be enhanced with the use of the planetary gear mechanism. Further, in driving the manipulating member, it is possible to impart the rotational force to the manipulation member after increasing the torque outputted from the motor by means of the planetary gear mechanism. That is, with the use of the planetary gear mechanism, the increase of the torque outputted from the motor and the enhancement of the resolution of the rotational amount of the manipulating member can be realized using the compact structure and hence, the miniaturization and the reduction of weight can be realized also from this aspect.

Further, according to the present invention, the sun gear and the planet gears can be adjusted in the properly meshed state by the adjusting means and hence, the occurrence of the excessive backlash derived from play between components can be prevented whereby the high transmission efficiency can be ensured between the knob and the output of the motor. That is, it is possible to ensure the high transmission efficiency between the knob and the output shaft of the motor without making the tolerance of respective parts small for enhancing the working accuracy and hence, the cost can be reduced.

Further, in the present invention, the adjusting means is provided with the support means which supports the sun gear in a tiltable manner and forms one of the sun gear and the planet gears in a barrel shape and hence, it is possible to make the sun gear and the planet gears meshed with each other in a state that the center of rotation of the sun gear is obliquely disposed with respect to the center of revolution of the planet gears by tilting the sun gear. Accordingly, the displacement between the output shaft of the motor and the carrier shaft can be eliminated whereby the meshing of the planet gears and the sun gear can be surely performed.

Further, in the present invention, the support means may include the first rotary body which is fixed to the output shaft of the motor, the second rotary body which is fixed to the sun gear and is engaged with and is integrally rotated with the first rotary body, and engaging means which makes the first rotary body and the second rotary body engaged with each other such that the second rotary body is tiltably supported and also makes the first rotary body and the second rotary body engaged with each other such that these rotary bodies are integrally rotated. With the provision of such a constitution, not only is it possible to support the first rotary body and the second rotary body by means of the engaging means such that the sun gear is tiltable, but also it is possible to rotate the first rotary body and the second rotary body integrally so that the rotational force outputted from the output shaft can be surely inputted to the sun gear. Accordingly, the lowering of the transmission efficiency of the rotational force transmitted from the output shaft to the sun gear can be prevented.

Further, in the present invention, the support means may include a projection which is mounted on the center of rotation of either one of the first rotary body and the second rotary body and a recess which is formed in the center of rotation of the other rotary body and is brought into slide contact with the projection. With the provision of such a constitution, the force imparted to the sun gear can be received by the first rotary body and hence, it is possible to surely hold the sun gear and the planet gears in the properly meshed state. Accordingly, it is possible to prevent the malfunction of the sun gear and the planet gears.

Further, in the present invention, the detection means can include the code plate which is integrally rotated with the output shaft of the motor and the code plate can be integrally formed with the first rotary body. With the provision of such a constitution, the number of parts can be reduced so that the cost can be reduced.

What is claimed is:

1. A manual inputting device comprising:
   a manipulating member which is manually operated and transmits signals corresponding to a rotational amount derived from manual manipulation;
   a motor which imparts a given feeling of manipulation to the manipulating member in response to the rotational amount derived from manual operation of the manipulating member;
   a planetary gear mechanism having a sun gear, planet gears, a ring gear, a carrier and a carrier shaft;
   a fixing member which fixes the ring gear of the planetary gear mechanism;
   a detector which detects a rotational direction and a rotational amount of an output shaft of the motor; and
   a controller which controls rotation of the motor in response to a detection result of the detector,
   wherein an output shaft of the motor is integrally formed with the sun gear, and wherein the manipulating member is integrally formed with the carrier shaft of the planetary gear mechanism.

2. A manual inputting device according to claim 1, wherein the manual inputting device further includes: a guide which movably supports the manipulating member in an axial direction thereof; a biasing mechanism which biases the manipulating member in the axial direction; and a switch manipulating portion to operate a given switch in response to movement of the manipulating member against the biasing mechanism.

3. a manual inputting device comprising:
   a manipulating member which is manually rotated and transmits signals corresponding to a rotational amount derived from manual manipulation;
   a motor which imparts a given feeling of manipulation to the manipulating member in response to the rotational amount derived from manual operation of the manipulating member;
   a planetary gear mechanism having a sun gear to which a rotational force is inputted from an output shaft of the motor, a plurality of planet gears which mesh with the sun gear and revolve around the sun gear, a ring gear which has an inner peripheral side thereof meshed with the planet gears, a carrier which is integrally rotated with the revolving planet gears and a carrier shaft which outputs a rotational force of the carrier to the manipulating member;
   a fixing member which fixes the ring gear of the planetary gear mechanism;
   a detector which detects the rotational amount of the output shaft of the motor;
   a controller which controls rotation of the motor in response to a detection result of the detector; and
   an adjusting mechanism which adjusts meshing of the sun gear and the planet gears.

4. A manual inputting device according to claim 3, wherein the adjusting mechanism is provided with a support which supports the sun gear in a tiltable manner, and wherein one of the sun gear and the planet gears is formed in a barrel shape.

5. A manual inputting device according to claim 4, wherein the support includes: a first rotary body which is fixed to the output shaft of the motor; a second rotary body which is fixed to the sun gear and is engaged and integrally rotated with the first rotary body; and an engaging mechanism which makes the first rotary body and the second rotary body engaged with each other such that the second rotary body is tiltably supported and also makes the first rotary body and the second rotary body engaged with each other such that the rotary bodies are integrally rotated.

6. A manual inputting device according to claim 5, wherein the support includes a projection which is mounted on a center of rotation of one of the first rotary body and the second rotary body and a recess which is formed in a center of rotation of the other of the first and second rotary bodies and is brought into slide contact with the projection.

7. A manual inputting device according to claim 5, wherein the detector includes a code plate which is integrally rotated with the output shaft of the motor, and wherein the code plate is integrally formed with the first rotary body.

8. A manual inputting device according to claim 6, wherein the detector includes a code plate which is integrally rotated with the output shaft of the motor, and wherein the code plate is integrally formed with the first rotary body.

* * * * *